(12) United States Patent
Dukhovny et al.

(10) Patent No.: US 11,210,160 B1
(45) Date of Patent: Dec. 28, 2021

(54) COMPUTER INFORMATION TECHNOLOGY ALERT REMEDIATION SELECTION BASED ON ALERT SIMILARITY

(71) Applicant: ServiceNow, Inc., Santa Clara, CA (US)

(72) Inventors: Vadim Dukhovny, Petach Tikva (IL); Dov Miron, Petach Tikva (IL); Ofer Gati, Netanya (IL); Bnayahu Makovsky, Savyon (IL); Mohammad Iktelat, Daburriya (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/992,963

(22) Filed: Aug. 13, 2020

(51) Int. Cl.
*G06F 11/07* (2006.01)
*G06F 11/32* (2006.01)

(52) U.S. Cl.
CPC ........ *G06F 11/0793* (2013.01); *G06F 11/079* (2013.01); *G06F 11/0751* (2013.01); *G06F 11/0772* (2013.01); *G06F 11/327* (2013.01)

(58) Field of Classification Search
CPC ............. G06F 11/0793; G06F 11/0751; G06F 11/079; G06F 11/0772; G06F 11/327
See application file for complete search history.

(56) References Cited

U.S. PATENT DOCUMENTS

| | | | | |
|---|---|---|---|---|
| 9,639,414 | B1* | 5/2017 | Wu | G06F 11/0748 |
| 10,176,032 | B2* | 1/2019 | Horrell | G05B 23/0275 |
| 2002/0173997 | A1* | 11/2002 | Menard | H04L 63/02 709/223 |
| 2009/0265587 | A1* | 10/2009 | Yamaguchi | H04L 41/0654 714/48 |
| 2010/0023604 | A1* | 1/2010 | Verma | H04L 41/0853 709/221 |
| 2012/0036397 | A1* | 2/2012 | Balani | G06F 11/079 714/38.11 |
| 2012/0210434 | A1* | 8/2012 | Curtis | H04L 63/1441 726/25 |
| 2018/0101907 | A1 | 4/2018 | Yamashita | |
| 2018/0351783 | A1 | 12/2018 | Patrich | |
| 2019/0222503 | A1 | 7/2019 | Bell | |
| 2020/0201744 | A1* | 6/2020 | Ho | G06F 11/3692 |
| 2020/0314118 | A1 | 10/2020 | Levin | |
| 2020/0327005 | A1 | 10/2020 | Singh | |
| 2020/0327008 | A1 | 10/2020 | Singh | |
| 2021/0081539 | A1 | 3/2021 | Karin | |

* cited by examiner

*Primary Examiner* — Jigar P Patel
(74) *Attorney, Agent, or Firm* — Van Pelt, Yi & James LLP

(57) ABSTRACT

A new alert associated with a computer information technology issue to be remediated is received. Matching previous alerts similar to the new alert are determined. One or more successful remediation actions of the matching previous alerts are identified. The one or more successful remediation actions are evaluated. A performance of a selected one of the one or more successful remediation actions is initiated.

20 Claims, 6 Drawing Sheets

COMPUTER INFORMATION TECHNOLOGY ALERT REMEDIATION SELECTION BASED ON ALERT SIMILARITY

BACKGROUND OF THE INVENTION

Information technology (IT) is the use of computers to store, retrieve, transmit, and manipulate data. IT systems include information systems, communications systems, and computer systems (e.g., hardware, software, and peripheral equipment) operated by users. IT systems oftentimes support business operations. An IT administrator, also known as a system administrator, is a specialist responsible for the maintenance, configuration, and reliable operation of IT systems, including servers, network equipment, and other IT infrastructure. IT administrators respond to IT problem alerts (e.g., regarding failure of computers, networks, software, etc.). IT administrators are tasked with resolving these IT problem alerts by remediating the underlying IT issues. Oftentimes, an IT administrator may not know what remediation to apply to resolve each open IT problem alert and/or can be overwhelmed by an abundance of IT alerts. Thus, techniques directed toward assisting IT administrators with IT problem alert remediation would be beneficial.

BRIEF DESCRIPTION OF THE DRAWINGS

Various embodiments of the invention are disclosed in the following detailed description and the accompanying drawings.

DETAILED DESCRIPTION

Figure 1:
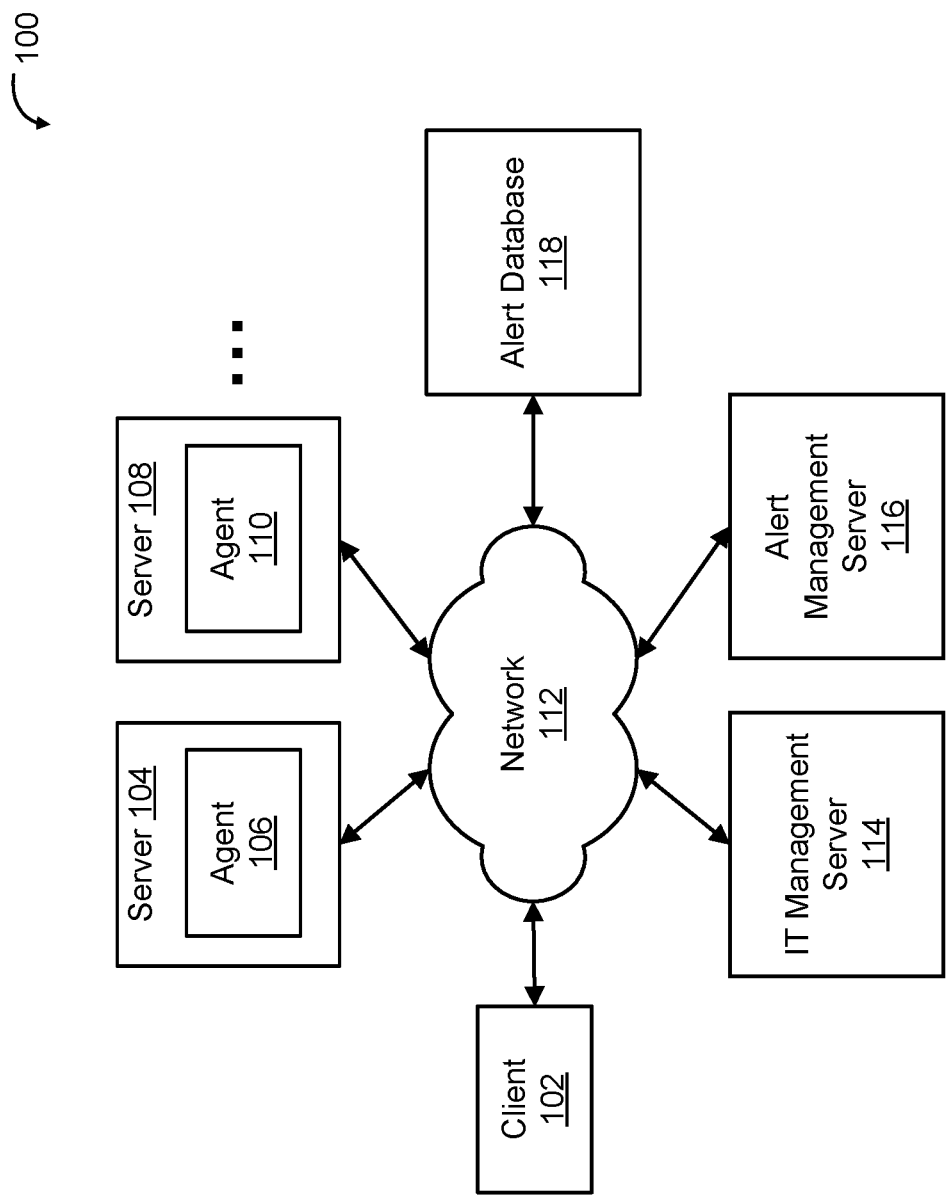
FIG. 1 is a block diagram illustrating an embodiment of a system for managing and remediating IT alerts.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A new alert associated with a computer information technology issue to be remediated is received. Matching previous alerts similar to the new alert are determined. One or more successful remediation actions of the matching previous alerts are identified. The one or more successful remediation actions are evaluated. A performance of a selected one of the one or more successful remediation actions is initiated. A practical and technological benefit of the techniques disclosed herein is more efficient IT system management through improved handling of IT problem alerts (also referred to herein simply as alerts). IT system technology is improved through the disclosed techniques that allow for automatic remediation of IT problem alerts. IT system technology is also improved through the disclosed techniques that significantly reduce the amount of human intervention required for remediation of IT problem alerts. Prior approaches that involve significant human intervention (e.g., by an IT administrator) are less efficient and can result in the IT administrator being overwhelmed by more IT problem alerts than the IT administrator can handle.

FIG. 1 is a block diagram illustrating an embodiment of a system for managing and remediating IT alerts. In the example shown, system 100 includes client 102, servers 104 and 108, network 112, IT management server 114, alert management server 116, and alert database 118. In some embodiments, client 102 is a programmed computer system. In various embodiments, client 102 is a computer or other hardware device that a user, such as an IT administrator, utilizes to interface with one or more servers associated with managing and remediating alerts. Examples of client hardware devices include desktop computers, laptop computers, tablets, smartphones, and other devices. In various embodiments, client 102 includes a software user interface, such as a graphical user interface, through which the user views alerts associated with IT issues, views a list of potential remediations (also referred to herein as remediation actions) for each alert, and selects remediations for alerts. The software user interface may be a web portal, internal network portal, other portal, browser, or mobile application that allows users to manage and remediate alerts.

In some embodiments, client 102 is a mobile device that includes a user interface that allows the user to view alerts, view potential remediations, and select remediations to initiate. In various embodiments, the mobile device is a computing device that is small enough to hold and operate in a person's hand. In various embodiments, the mobile device includes a flat screen display (e.g., a liquid crystal display or a light-emitting diode display), an input interface (e.g., with touchscreen digital buttons), and wireless connectivity hardware (e.g., Wi-Fi, Bluetooth, cellular, etc.). Examples of mobile devices include smartphones, smartwatches, and tablets.

In the example illustrated, client 102 is communicatively connected to network 112. IT alerts are managed and remediated by interfacing with IT management server 114 via network 112. Examples of network 112 include one or more of the following: a direct or indirect physical communication connection, mobile communication network, Internet, intranet, Local Area Network, Wide Area Network, Storage Area Network, and any other form of connecting two or more systems, components, or storage devices together. In the example illustrated, various servers (e.g., servers 104 and 108, IT management server 114, and alert management server 116) are communicatively connected via network 112. In various embodiments, each server is a computer or other hardware component that provides a specified functionality for client 102 or another computer or device.

In the example illustrated, servers 104 and 108 are examples of IT assets from which IT alerts may arise. For example, software applications or software processes running on servers 104 and 108 may be unresponsive, thus triggering alerts. As used herein, a software process (or process for short) refers to an instance of a computer program that is being executed by electronic circuitry of a computer, such as a central processing unit. The computer program associated with the process is a collection of instructions while the process is the execution of those instructions. Several processes may be associated with the same computer program (also referred to as an application). There may be tens or hundreds of processes associated with each application, and there may be hundreds of applications running on a sever. Thus, many IT alerts can result from software failures. Example potential remediation actions for unresponsive software (e.g., an unresponsive process) include stopping the process (e.g., pausing the process and continuing it later), ending the process (e.g., terminating the application to which the process belongs), killing the process (e.g., forcing closure without cleaning up temporary files associated with the process), and restarting the device/server on which the process is running. As another example, hardware components of servers 104 and 108 may also become unresponsive or otherwise fail to perform properly, thus triggering IT alerts. Examples of hardware IT problems include power supply problems, hard drive failures, overheating, connection cable failures, and network connectivity problems. Example remediation actions include updating hardware configurations, restarting devices/servers, and dispatching a technician to physically attend to the hardware (e.g., by replacing the hardware). The example shown is illustrative and not restrictive. Additional servers that include IT assets may also exist and be communicatively connected via network 112.

In the example illustrated, servers 104 and 108 include agents 106 and 110, respectively. Agents 106 and 110 are software applications (e.g., event monitoring software) that collect, analyze, and report specified event occurrences on servers 104 and 108, respectively. In some embodiments, each agent detects IT performance problems, collects associated information, and transmits the information to alert management server 116. In various embodiments, alert management server 116 utilizes the information transmitted by an agent to create an alert associated with an IT problem. In various embodiments, the alert includes various fields that are useful for uniquely identifying the alert and managing the alert. Examples of alert fields include a number field (e.g., storing a unique identification number), a source field (e.g., storing the event monitoring software reporting the problem), a node field (e.g., storing a domain name, IP address, MAC address, etc. associated with the IT problem), a type field (e.g., storing a description of the IT problem), a configuration item field (e.g., storing a JavaScript Object Notation (JSON) string that identifies the service component, infrastructure element, or other IT item—hardware, software, network, storage, or otherwise—that is managed to ensure delivery of IT services), a severity field (e.g., storing a qualitative rating of the severity of the alert, such as critical, major, minor, etc.), a state field (e.g., storing a status, such as open, closed, etc.), an acknowledged field (e.g., storing an indication as to whether a user has acknowledged the alert), an initial event generation time field (e.g., storing the time when an agent detected the underlying event/IT problem that triggered the alert), an alert creation field (e.g., storing the time when the alert was created), an alert remediation action field (e.g., storing attempted alert remediation actions and the times the actions were taken), and an alert closure field (e.g., storing the time when the alert was closed).

In some embodiments, alert management server 116 is accessed by IT management server 114. In some embodiments, IT management server 114 provides various IT management services and tools that are controlled by client 102 via network 112 to manage IT issues (e.g., IT issues associated with servers 104 and 108). Examples of IT management tasks include creating and updating an inventory of IT assets, defining and managing user access priorities associated with various IT assets, configuring and running IT infrastructure components, and managing IT alerts. Thus, in addition to accessing alert management server 116, IT management server 114 may also access various other IT related services hosted on different servers. In various embodiments, IT management server 114 provides an alert remediation interface to a user through client 102. In various embodiments, IT management server 114 coordinates with alert management server 116 and alert database 118 to initiate performance of alert remediation actions selected by the user of client 102 or alert remediation actions that are selected automatically. In some embodiments, IT management server 114 receives an alert of interest from alert management server 116, determines matching previous alerts similar to the alert of interest, identifies successful remediation actions of the matching previous alerts, evaluates the successful remediation actions, and initiates a performance of a selected successful remediation action. The example shown is illustrative and not restrictive. Alternative arrangements and/or connections between the components shown are also possible. For example, it is possible for IT management server 114 and alert management server 116 to be integrated into a single component that is an IT application node. Furthermore, it is also possible for IT management server 114, alert management server 116, and alert database 118 to all be subcomponents of a unified IT instance component.

In some embodiments, IT management server 114 selects a remediation to perform automatically or selects several remediations to recommend to a user (e.g., an IT administrator) for a given alert of interest based on prior successful remediations performed for similar alerts. In various embodiments, IT management server 114 determines similar alerts by comparing the given alert of interest against alerts stored in alert database 118. Alert database 118 is an example of an alert data store (a storage location for alerts). In various embodiments, alert database 118 is a structured set of data held in one or more computers and/or storage devices. Examples of storage devices include hard disk drives and solid-state drives. In some embodiments, alert database 118 stores specified alert information corresponding to IT problems associated with IT assets on servers communicatively connected to network 112 (e.g., servers 104 and 108). The specified alert information includes remediation actions performed for alerts. Identifying successful remediations is described in further detail herein (e.g., see FIG. 3). In some embodiments, alert database 118 receives information to store from alert management server 116. For example, in some embodiments, upon closure of an alert, alert management server 116 transfers specified data fields associated with the alert to alert database 118 for storage. The stored information can be used for future reference and alert management purposes. In the example illustrated, alert management server 116 and alert database 118 are shown as separate components that are communicatively connected. It is also possible for alert database 118 to be a part of alert management server 116 and for alert management server 116 to manage transfer of alert database data to IT management server 114.

In some embodiments, alerts stored in alert database 118 are grouped according to alert similarity. For example, each alert may be associated with a feature vector based on alert parameters. Each feature vector can be mapped to a vector space and clustered with similar feature vectors (e.g., according to a vector distance metric). Thus, alerts with similar parameters are able to be quantitatively compared and grouped together. An example of a parameter that a feature vector can be based on is alert text (e.g., from the type field stored in alert management server 116 and described above). Other fields stored in alert management server 116 can also be utilized to compare and group alerts (e.g., the node field and the configuration item field). In some embodiments, text similarity (e.g., alert description text similarity) is utilized to group alerts and is determined based at least in part on keyword matching (e.g., alert text descriptions with similar keywords indicating alert similarity). Natural language processing (NLU) may also be utilized to determine alert text similarity. For example, in some embodiments, a trained machine learning model is utilized to parse utterances associated with alert text to extract intents. An utterance refers to a natural language example of an intent, e.g., a text string from an alert text description, and an intent refers to a meaning, e.g., "the process is unresponsive", "there is no network connection", or another human understandable description of an IT problem. Examples of machine learning models that can be utilized to perform NLU tasks include word vector representations, window-based neural networks, recurrent neural networks, long-short-term-memory models, recursive neural networks, and convolutional neural networks. Prior to utilizing the machine learning model, the machine learning model is trained on a collection of example utterances (e.g., example alert descriptions) and their associated meanings. The training occurs before a new utterance (new alert text) is processed using the machine learning model in inference mode. Alerts whose alert text descriptions have similar meanings are grouped together.

In some embodiments, alerts are grouped based at least in part on server and/or application similarity. For example, each IT problem for which an alert is generated occurs in a server setting that can be characterized according to specified parameters. The IT problem (and thus the alert) can be associated with an application fingerprint. The application fingerprint is based on the applications and/or processes that are executing when the IT problem occurs. The application fingerprint can also include hardware components installed on the server where the applications and processes are being executed. Software and hardware components are CIs. Thus, server similarity can be regarded as CI similarity. In some embodiments, a constellation of CIs (e.g., applications, processes, hardware devices, etc.) associated with an IT problem is parameterized into a feature vector and associated with the IT problem and its corresponding IT alert. Different feature vectors corresponding to different IT alerts can be grouped according to a similarity metric by a machine learning model. Stated alternatively, in some embodiments, IT alerts are clustered based on various parameters (e.g., associated CIs). Various approaches for clustering alerts can be utilized. In some embodiments, the alerts are clustered using density-based spatial clustering of applications with noise (DBSCAN). Other clustering approaches that can be used include K-means clustering, mean-shift clustering, expectation-minimization clustering using gaussian mixture models, agglomerative hierarchical clustering, and various other approaches known in the art.

In various embodiments, IT management server 114 determines matching previous alerts similar to an alert of interest by comparing a metric associated with the alert of interest with metrics associated with the previous alerts stored in alert database 118. For example, a feature vector associated with the alert of interest (in the same format as feature vectors of alerts in alert database 118) can be compared with feature vectors of alerts in alert database 118. For alerts in alert database 118 that are already clustered according to alert similarity, determining a matching cluster of similar alerts corresponds to determining a cluster that is closest (e.g., closest vector distance) to the feature vector associated with the alert of interest. In various embodiments, IT management server 114 retrieves remediation information associated with the determined similar alerts and identifies previously successful remediation actions. The successful remediation actions are then evaluated to determine one or more top remediation action candidates for the alert of interest. Evaluating successful remediation actions is described in further detail herein (e.g., see FIG. 4).

In various embodiments, IT management server 114 facilitates multiple alert remediation modes. In some embodiments, a manual remediation mode is utilized in which a user (e.g., an IT administrator) is presented with multiple (e.g., two or three) remediation options (e.g., via a user interface of client 102). The user is able to select a remediation action and initiate performance of the selected remediation action. Presenting a limited set of relevant options is particularly important for mobile platforms, whose user interfaces are typically more compact. In some embodiments, an automatic remediation mode is utilized in which a remediation is automatically selected to be performed. Selecting the remediation may be based on various factors, including likelihood of success of the remediation and cost of unsuccessful remediation. Initiating remediations is described in further detail herein (e.g., see FIG. 5). In some embodiments, IT management server 114 supplies alert management server 116 with automated alert management rules. Automated alert process workflows can be initiated based on the alert management rules. Alerts matching a first set of specified conditions can be assigned to automated remediation in which a remediation action is automatically selected and alerts matching other specified conditions can be assigned to manual remediation in which an IT administrator must select a remediation. In some embodiments, alert management rules include attempting a backup remediation action if a first remediation action fails and/or attempting remediation actions successively in a specified order until remediation is successful.

In some embodiments, the techniques disclosed herein are utilized in a data center IT environment. In a data center environment (and in other IT environments), multiple alerts can be reported by multiple monitoring systems in a short period of time. Because alerts are reported rapidly, it can be difficult to analyze alerts in real time to determine appropriate remediation actions. Prior approaches can be cumbersome due to the need to manually determine similar alerts, which can be infeasibly time consuming for IT administrators. The techniques disclosed herein are advantageous because they automate at least a portion of the workflow for IT problem remediation, thereby saving time for IT administrators. For example, presenting a handful of remediation actions from which to select for an IT administrator removes the need for the IT administrator to investigate remediation action candidates. In some embodiments, likelihood of success associated with potential remediation actions are presented to the IT administrator. For example, "restart server (80%)", "kill process (10%)", and "add disk (5%)" may be presented as options. In some embodiments, the percentages are based on remediation success rates of the corresponding remediation actions for previous similar alerts.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional clients and servers may exist. The number of components and the connections shown in FIG. 1 are merely illustrative. Components not shown in FIG. 1 may also exist.

Figure 2:
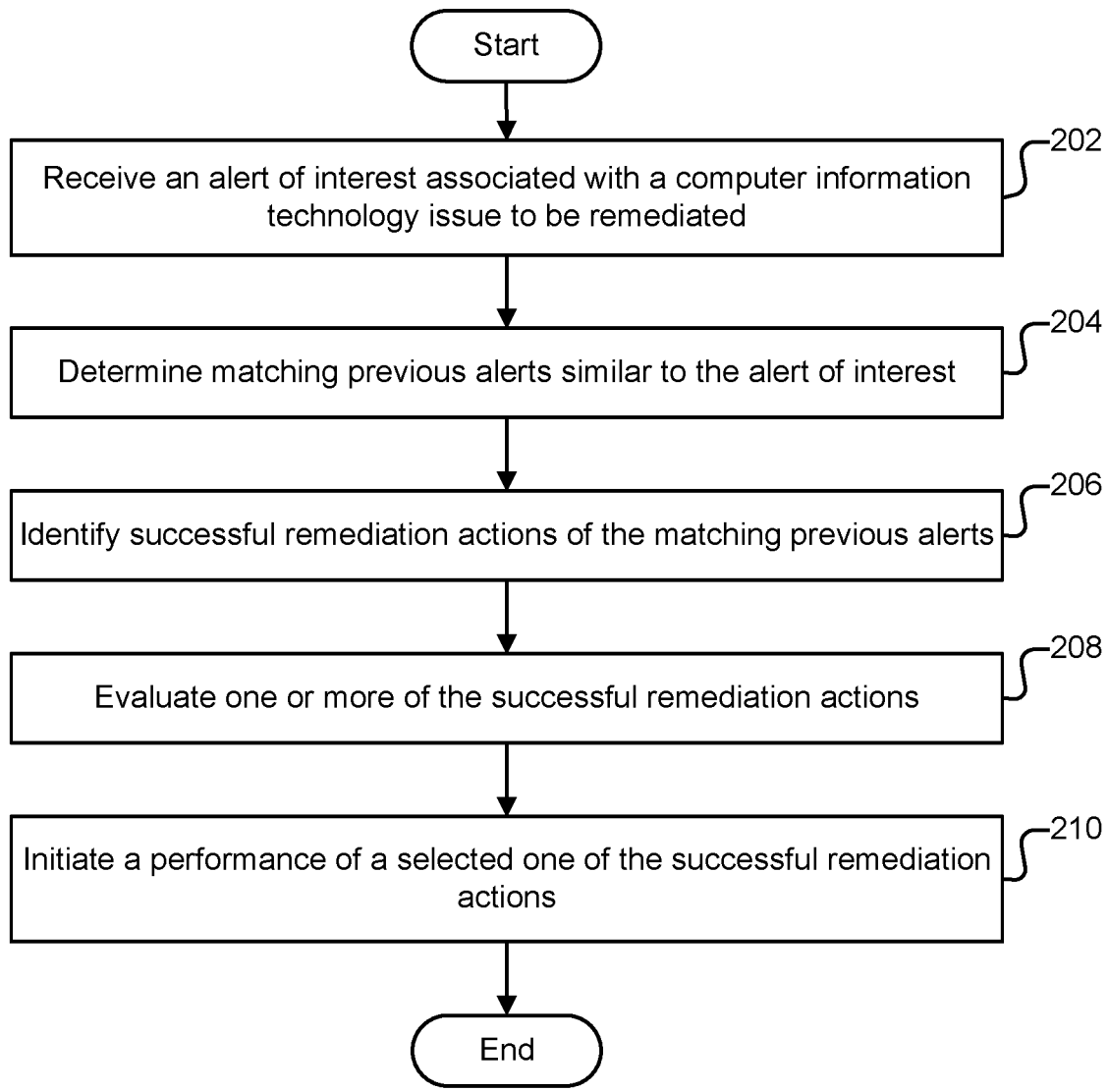
FIG. 2 is a flow chart illustrating an embodiment of a process for remediating an IT alert.

FIG. 2 is a flow chart illustrating an embodiment of a process for remediating an IT alert. In some embodiments, the process of FIG. 2 is performed by IT management server 114 of FIG. 1.

At 202, an alert of interest (a new alert) associated with a computer information technology issue to be remediated is received. In some embodiments, the alert of interest is received by IT management server 114 of FIG. 1 from alert management server 116 of FIG. 1. In various embodiments, the alert of interest is presented to a user (e.g., an IT administrator) via a client device (e.g., client 102 of FIG. 1) for user input. It is also possible for the alert of interest to be remediated automatically without user input (in which case the alert of interest may not need to be presented to the user except for a notification after the alert of interest has been remediated). In some embodiments, the alert of interest is created by alert management server 116 of FIG. 1 in coordination with event monitoring software installed on a server from which the computer information technology issue corresponding to the alert of interest originated. Examples of computer information technology issues include unresponsive software (e.g., an unresponsive application, process, etc.), other software issues (e.g., a runtime error, failure to execute, failure to terminate, etc.), and hardware issues (e.g., power supply problems, hard drive failures, overheating, connection cable failures, and network connectivity problems).

At 204, matching previous alerts similar to the alert of interest are determined. In some embodiments, similar alerts are retrieved from alert database 118 of FIG. 1. In some embodiments, similar alerts are clustered utilizing a trained machine learning model. Example clustering approaches include DB SCAN, K-means clustering, mean-shift clustering, expectation-minimization clustering using gaussian mixture models, and agglomerative hierarchical clustering. Parameters of alerts utilized to assess alert similarity (e.g., by clustering) include: keywords in alert text descriptions, alert text description meaning (e.g., as determined by natural language processing), types of software applications and/or processes running when alerts are generated, types of hardware on servers originating the alerts, and other CI information associated with the alerts. Stated alternatively, in some embodiments, alerts are clustered based at least in part on configuration item similarity. For example, alerts originating from similar servers (e.g., similar processes executing, similar hardware, etc.) can be classified as similar alerts. In some embodiments, similar alerts are determined by a machine learning model. For example, the machine learning model may parameterize the alert of interest (e.g., into a feature vector) and compare the alert of interest against other alerts (also parameterized by the machine learning model) stored in an alert database. Alerts in the alert database that are quantitatively close to the alert of interest (e.g., according to a vector distance metric) are determined to be similar alerts. Examples of machine learning models include word vector representations, window-based neural networks, recurrent neural networks, long-short-term-memory models, recursive neural networks, and convolutional neural networks. Prior to utilizing the machine learning model, the machine learning model is trained on a collection of example alerts. The training occurs before the alert of interest is processed using the machine learning model in inference mode.

At 206, successful remediation actions of the matching previous alerts are identified. A principle of the techniques disclosed herein is that remediations actions that are successful for previous similar alerts are likely to be successful for the alert of interest. Various approaches are possible to identify successful remediation actions. In some embodiments, remediation actions that occurred within a specified period of time (e.g., 1 second, 3 seconds, 1 minute, 5 minutes, 30 minutes, etc.) before similar alerts were successfully closed are identified. The proximity in time between a remediation action and closing (resolution) of an alert indicates a cause and effect relationship between the remediation action and the closing of the alert. In some embodiments, the times at which alerts are closed are monitored by alert management server 116 of FIG. 1 and/or various associated software agents. Identifying successful remediation actions of matching previous alerts is described in further detail herein (e.g., see FIG. 3).

At 208, one or more of the successful remediation actions are evaluated. In some embodiments, evaluating the successful remediation actions includes assigning scores to the successful remediation actions. In various embodiments, the scores are utilized to rank the successful remediation actions according to effectiveness (e.g., so as to present two to three top previously successful remediation action candidates to an IT administrator). In some embodiments, a score associated with a previously successful remediation action is calculated by determining an effectiveness metric associated with the previously successful remediation action with respect to matching previous alerts. In some embodiments, the scores are calculated by analyzing data stored in an alert database (e.g., alert database 118 of FIG. 1). In various embodiments, the stored data includes times that alerts are resolved and times that remediation actions for the alerts are performed. Evaluating remediation actions is described in further detail herein (e.g., see FIG. 4).

At 210, a performance of a selected one of the successful remediation actions is initiated. In some embodiments, multiple modes of alert remediation are possible and it is possible to switch between the modes. For example, a fully automatic remediation mode can be activated in which a single remediation action is automatically selected without input from a user (e.g., an IT administrator). In some embodiments, e.g., in an automatic mode, if the remediation action that has been selected fails to resolve (close) the alert, performance of a next remediation action is initiated. The fully automatic mode can be deactivated and a manual mode activated instead. In some embodiments, the manual mode involves presenting a specified number of remediation action options to the user (e.g., the IT administrator). In some embodiments, the remediation actions that are presented have the highest effectiveness scores as determined in 208 above. Presenting the user with remediation action options, e.g., in a manual mode, has a benefit of allowing the user to attempt a less costly (e.g., in terms of time to complete) remediation action even if the less costly remediation action has a lower probability of success.

Figure 3:
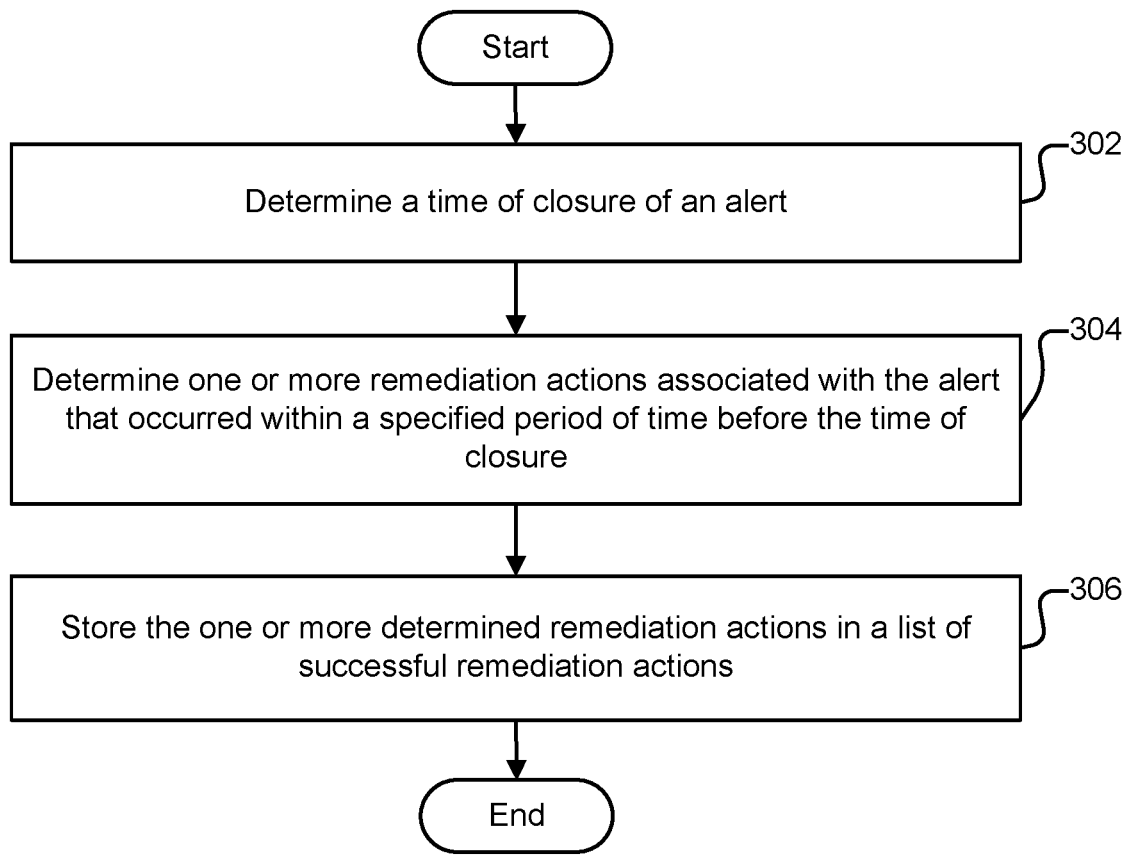
FIG. 3 is a flow chart illustrating an embodiment of a process for identifying successful remediation actions for an alert.

FIG. 3 is a flow chart illustrating an embodiment of a process for identifying successful remediation actions for an alert. In some embodiments, the process of FIG. 3 is performed by IT management server 114 of FIG. 1. In some embodiments, at least of portion of the process of FIG. 3 is performed in 206 of FIG. 2. In various embodiments, the alert has already been identified as an alert that is similar to an alert of interest.

At 302, a time of closure of an alert is determined. The time of closure of the alert indicates that the alert has been successfully remediated before the time of closure. In some embodiments, event monitoring software agents in coordination with alert management server 116 of FIG. 1 determine the time of closure. In some embodiments, a timestamp of the time of closure is recorded by alert management server 116 of FIG. 1.

At 304, one or more remediation actions associated with the alert that occurred within a specified period of time before the time of closure are determined. Examples time periods (windows of time) for the specified period of time include 1 second, 3 seconds, 1 minute, 5 minutes, 30 minutes, or any other period of time. The specified period of time in which to search for remediation actions can be adjusted according to empirical analysis. Shorter windows of time correspond to a higher chance of a cause and effect relationship between detected remediation actions and successful resolutions of alerts, but not all successful remediation actions may be captured for windows of time that are too short. On the other hand, longer windows of time capture more remediation actions but could also capture remediation actions that do not cause successful resolution of alerts. In some embodiments, timestamps associated with remediation actions are recorded. For example, a timestamp of when a restart server action has been completed can be recorded. In some embodiments, the remediation actions correspond to actions in a list of actions that IT administrators commonly utilize to remediate IT alerts. Thus, in some embodiments, timestamps corresponding to completion of actions selected by IT administrators are recorded. In various embodiments, the timestamps for completion of remediation actions are compared with the timestamp of the time of closure of the alert to determine whether the remediation actions occurred within the specified period of time. In various embodiments, remediation actions that occurred within the specified period of time are classified as successful remediation actions.

At 306, the one or more determined remediation actions are stored in a list of successful remediation actions. The list of successful remediation actions is associated with a group of similar alerts. In various embodiments, the process of FIG. 3 is performed for each alert in the group of similar alerts, adding to the list of successful remediation actions as different alerts in the group of similar alerts are processed to identify successful remediation actions. The successful remediation actions can then be evaluated (e.g., scored) (e.g., see FIG. 4) to determine one or more remediation actions to recommend to a user for a new alert of interest that is determined to be similar to the group of similar alerts. In some embodiments, the list of successful remediation actions is stored in alert database 118 of FIG. 1. In some embodiments, the list of successful remediation actions is a list of remediation action and alert pairs, wherein each unique alert is stored with one or more corresponding successful remediation actions.

Figure 4:
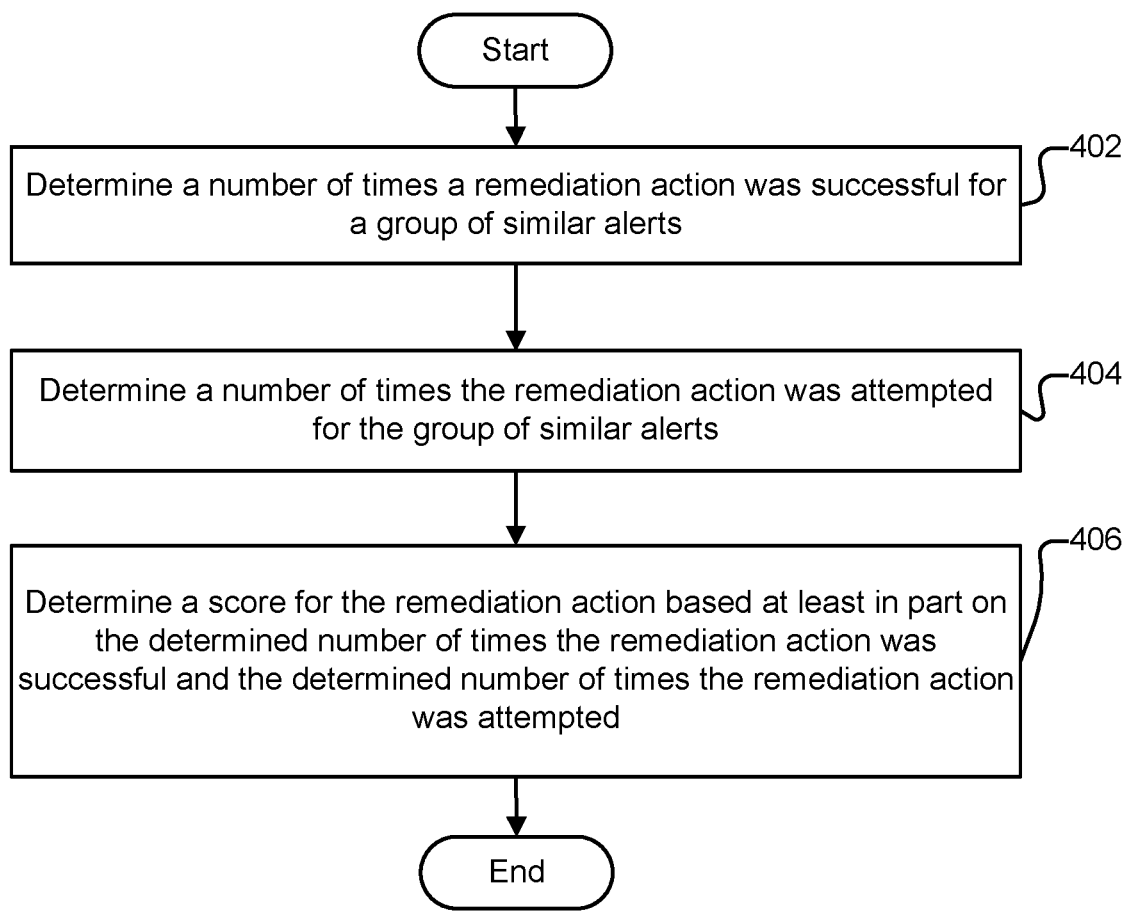
FIG. 4 is a flow chart illustrating an embodiment of a process for evaluating successful remediation actions.

FIG. 4 is a flow chart illustrating an embodiment of a process for evaluating successful remediation actions. In some embodiments, the process of FIG. 4 is performed by IT management server 114 of FIG. 1. In some embodiments, at a portion of the process of FIG. 4 is performed in 208 of FIG. 2. In various embodiments, the successful remediation actions that are evaluated are from a list of successful remediation actions associated with a group of similar alerts. In various embodiments, the successful remediation actions are ranked. In some embodiments, rankings are utilized to determine a single remediation action to automatically perform or multiple remediation actions to recommend to a user (e.g., an IT administrator).

At 402, a number of times a remediation action was successful for a group of similar alerts is determined. In various embodiments, the remediation action has already been identified as a successful remediation action for at least one alert in the group of similar alerts. For example, the remediation action may have been identified as occurring within a specified time period before that alert was closed (e.g., see FIG. 3). It is possible that this remediation action was attempted for other alerts in the group of similar alerts but did not successfully resolve those alerts (e.g., did not occur with the specified time period before alert closure). The number of times the remediation action resulted in successful closure of alerts in the group of similar alerts is determined. In some embodiments, the number of times the remediation action was successful is determined by tabulating occurrences of the remediation action in a list that includes alert and successful remediation action pairs for the group of similar alerts.

At 404, the number of times the remediation action was attempted for the group of similar alerts is determined. In various embodiments, all attempted remediation actions for an alert are stored (e.g., in alert database 118 of FIG. 1). In some embodiments, the number of times the remediation was attempted for the group of similar alerts is determined by tabulating occurrences of the remediation action in data records for the group of similar alerts stored in alert database 118 of FIG. 1.

At 406, a score for the remediation action is based at least in part on the determined number of times the remediation action was successful and the determined number of times the remediation action was attempted. In some embodiments, the score is determined by dividing the determined number of times the remediation action was successful by the determined number of times the remediation action was attempted. The score is thus a reflection of the effectiveness of the remediation applied to alerts in the group of similar alerts. The score can be multiplied by one hundred to obtain a success percentage. The score is a ratio of a numerator and a denominator. Alternative choices for the denominator are also possible. For example, instead of determining the number of times the remediation action was attempted at 404, a total number of alerts in the group of similar alerts can be determined and utilized as the denominator. This ratio is a reflection of the frequency of the remediation action within the group of similar alerts. Utilizing this ratio promotes remediation actions that are used frequently and avoids promoting remediation actions that may be outliers in terms of effectiveness (e.g., a remediation that was attempted only once and successful—a 100% effectiveness rate but with a small sample size). In some embodiments, success rate of a remediation action and its relative frequency compared with other remediation actions are both taken into account. For example, the two ratios described above may be combined as a sum of weighted averages, wherein the weights for the two ratios are adjusted to obtain the desired balance between success rate and frequency. It is also possible to achieve a similar effect by applying a threshold to remediation actions (e.g., only score remediation actions that have been used for the group of similar alerts at least a specified threshold number of times).

The above is illustrative and not restrictive. Various other scoring mechanisms are possible. For example, a cost model can be utilized. In some embodiments, each remediation action is assigned a cost corresponding to how disruptive the remediation action is to IT operations. For example, the remediation action of killing a process would have a lower cost than the remediation of restarting a computer/server because killing a process is less disruptive (e.g., consumes less time and effort for an IT administrator). In some embodiments, the score that is determined for each remediation action that is evaluated takes into account a probability of success and/or frequency of the remediation action (e.g., utilizing one or more of the ratios described above) as well as a cost of failure (e.g., by subtracting a cost value). In some embodiments, positive factors (e.g., rate of success) and negative factors (e.g., cost of failure) are combined into a function that is evaluated to determine a score for each remediation action.

Figure 5:
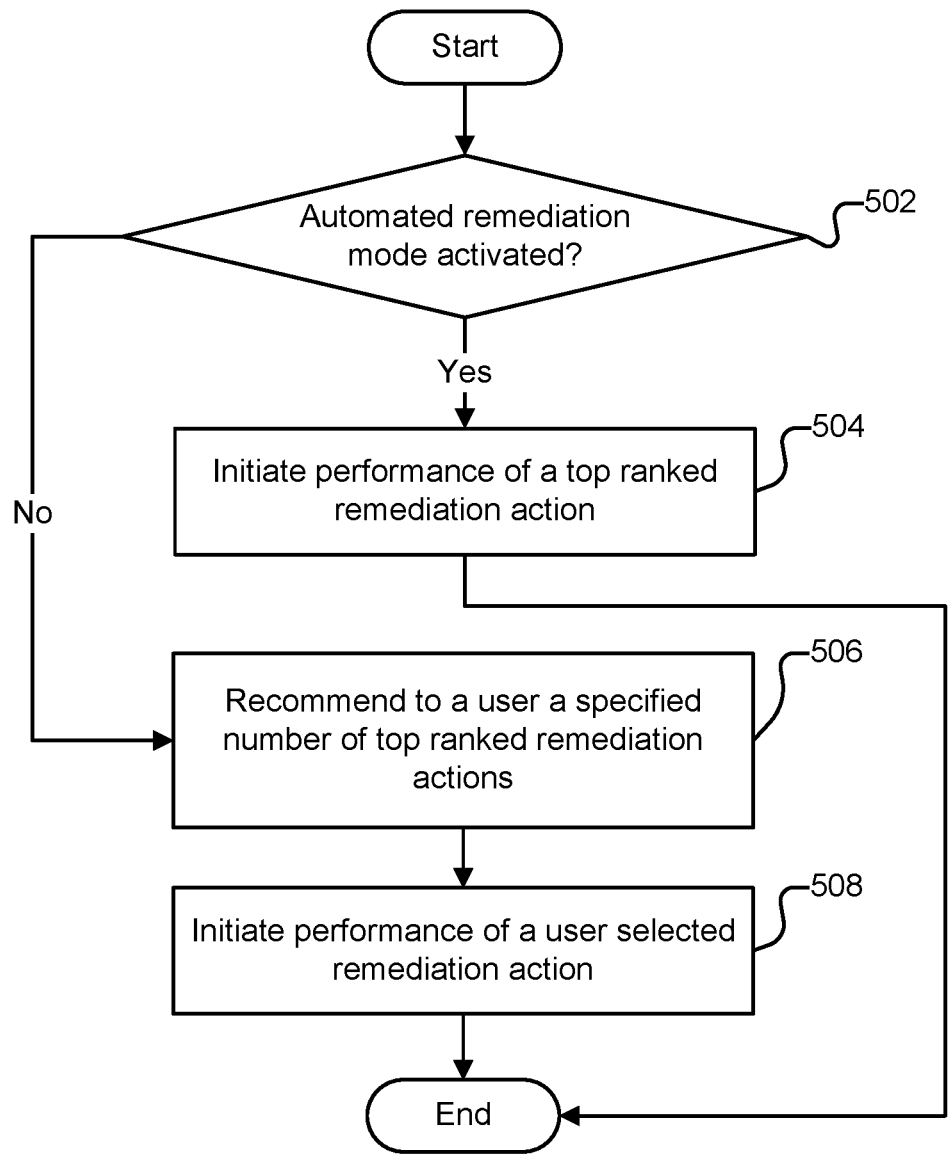
FIG. 5 is a flow chart illustrating an embodiment of a process for initiating a remediation.

FIG. 5 is a flow chart illustrating an embodiment of a process for initiating a remediation. In some embodiments, the process of FIG. 5 is performed by IT management server 114 of FIG. 1. In some embodiments, at least a portion of the process of FIG. 5 is performed in 210 of FIG. 2.

At 502, it is determined whether an automated remediation mode has been activated. In some embodiments, an automated remediation mode is utilized in which a remediation action is automatically selected to be performed. Selecting the remediation can be based on various factors, including likelihood of success of the remediation action and cost of unsuccessful remediation.

If at 502 it is determined that an automated remediation mode has been activated, at 504, performance of a top ranked remediation action is initiated. In some embodiments, ranking of potential remediation actions is determined according to scores assigned to each potential remediation action. In some embodiments, a score for a remediation action for an alert of interest is based on probability of success of the remediation action, frequency of use of the remediation action to remediate alerts similar to the alert of interest, and/or cost of failure of the remediation. In some embodiments, initiating performance of the remediation action includes transmitting a command via network 112 of FIG. 1 to a sever affected by the underlying IT issue that requires remediation. For example, a command to kill a process, restart a computer or server, or another command may be sent.

If at 502 it is determined that an automated remediation mode has not been activated, at 506, a specified number of top ranked remediation actions is recommended to a user. In some embodiments, the user is an IT administrator. In some embodiments, the recommendations are presented to the user via a user interface of client 102 of FIG. 1. In various embodiments, the remediation actions are ranked according to scores. In some embodiments, a score for a remediation action for an alert of interest is based on probability of success of the remediation action, frequency of use of the remediation action to remediate alerts similar to the alert of interest, and/or cost of failure of the remediation. Typically, the number of remediation actions presented to the user is limited to a small number (e.g., three) in order to allow the user to quickly make a selection. In various embodiments, the remediation actions are presented according to score with the highest scoring remediation action presented at the top of a list. In various embodiments, additional information is also presented with each remediation action (e.g., probability of success, frequency of use for similar alerts, and/or estimated time to complete the remediation action).

At 508, performance of a user selected remediation action is initiated. In various embodiments, the user selects the remediation action to be performed via a user interface (e.g., of client 102 of FIG. 1). In some embodiments, initiating performance of the remediation action includes transmitting a command via network 112 of FIG. 1 to a sever affected by the underlying IT issue that requires remediation. For example, a command to kill a process, restart a computer or server, or another command may be sent. In the example illustrated, remediation actions for prior similar alerts can be scored and/or ranked with respect to both automated and manual remediations. Remediation data/statistics associated with alerts are available for both automated and manual alert management (e.g., alerts that are created and/or remediated automatically as well as alerts that are created and/or remediated manually).

Figure 6:
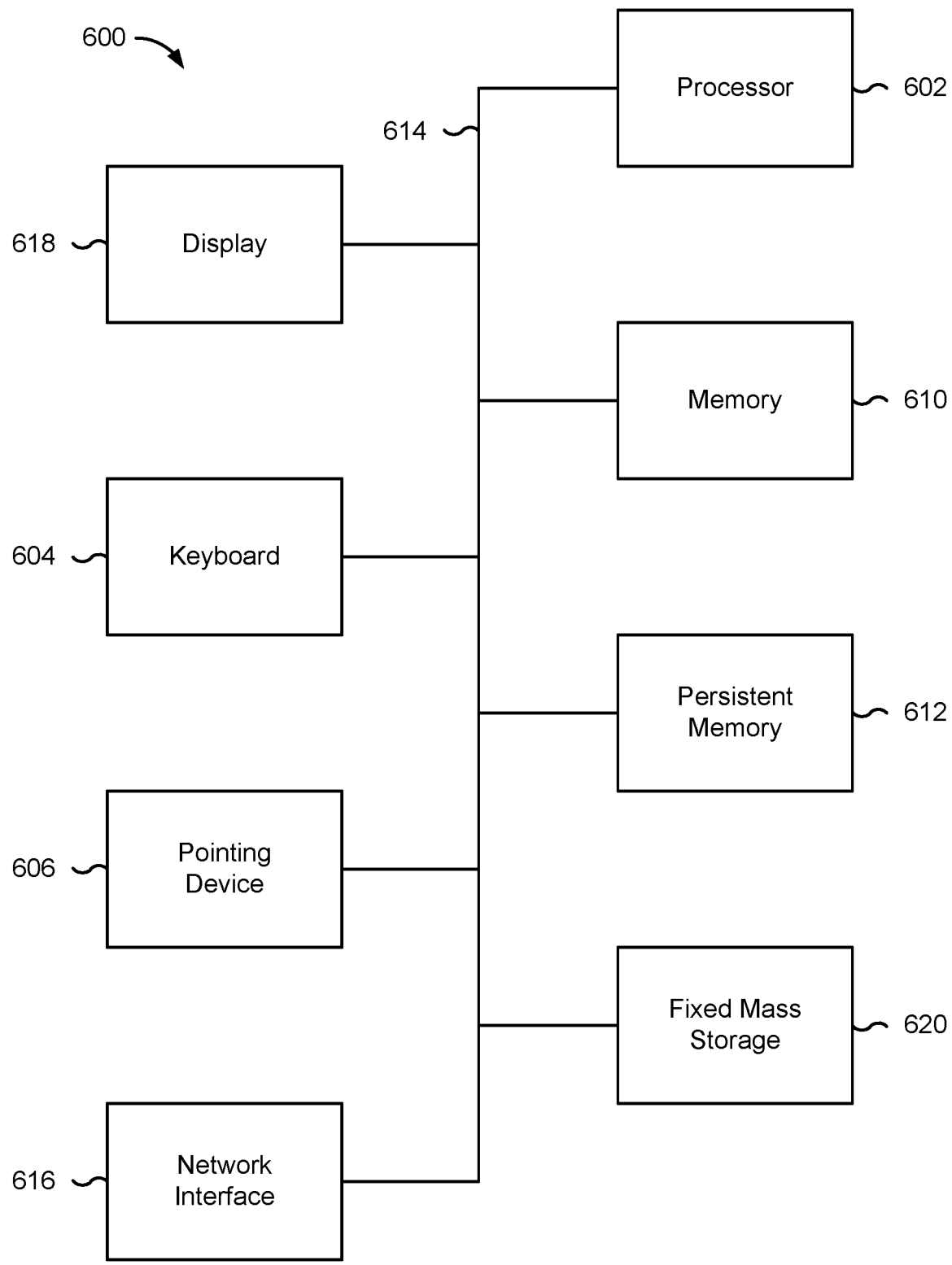
FIG. 6 is a functional diagram illustrating a programmed computer system.

FIG. 6 is a functional diagram illustrating a programmed computer system. In some embodiments, the programmed computer system is client 102 of FIG. 1. In some embodiments, the programmed computer system is a server in system 100 of FIG. 1.

In the example shown, computer system 600 includes various subsystems as described below. Computer system 600 includes at least one microprocessor subsystem (also referred to as a processor or a central processing unit (CPU)) 602. For example, processor 602 can be implemented by a single-chip processor or by multiple processors. In some embodiments, processor 602 is a general-purpose digital processor that controls the operation of computer system 600. Using instructions retrieved from memory 610, processor 602 controls the reception and manipulation of input data, and the output and display of data on output devices (e.g., display 618).

Processor 602 is coupled bi-directionally with memory 610, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also, as is well known in the art, primary storage typically includes basic operating instructions, program code, data, and objects used by processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

Persistent memory 612 (e.g., a removable mass storage device) provides additional data storage capacity for computer system 600, and is coupled either bi-directionally (read/write) or uni-directionally (read only) to processor 602. For example, persistent memory 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Persistent memory 612 and fixed mass storage 620 generally store additional programming instructions, data, and the like that typically are not in active use by processor 602. It will be appreciated that the information retained within persistent memory 612 and fixed mass storages 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, pointing device 606 can be a mouse, stylus, track ball, or tablet, and is useful for interacting with a graphical user interface.

Network interface 616 allows processor 602 to be coupled to another computer, computer network, or telecommunications network using a network connection as shown. For example, through network interface 616, processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect computer system 600 to an external network and transfer data according to standard protocols. Processes can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow processor 602 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a new alert associated with a computer information technology issue to be remediated;
   determining matching previous alerts similar to the new alert, wherein determining the matching previous alerts includes identifying a group of similar alerts in an alert data store that are at least substantially similar, according to a specified metric, to the new alert, wherein the specified metric is a vector distance between a feature vector associated with the new alert and candidate clusters of alerts stored in the alert data store;
   identifying one or more successful remediation actions of the matching previous alerts;
   evaluating the one or more successful remediation actions; and
   initiating a performance of a selected one of the one or more successful remediation actions.

2. The method of claim 1, wherein the computer information technology issue is associated with one or more of the following: an unresponsive software process, an unresponsive software application, a software runtime error, a software failure to execute, or a software failure to terminate.

3. The method of claim 1, wherein the computer information technology issue is associated with one or more of the following: a power supply failure, a hard drive failure, overheating, a connection cable failure, or a network connectivity failure.

4. The method of claim 1, further comprising presenting the new alert to an information technology administrator through a user interface of a programmed computer system.

5. The method of claim 1, wherein the new alert is received from an alert management information technology component that generated the new alert based at least in part on information collected by an event monitoring software agent.

6. The method of claim 1, wherein determining the matching previous alerts includes comparing one or more parameters associated with the new alert with corresponding parameters of alerts stored in an alert data store.

7. The method of claim 6, wherein the one or more parameters includes one or more of the following: one or more alert description text keywords, alert description text meaning, software components associated with an alert-triggering underlying information technology problem, or hardware components associated with the alert-triggering underlying information technology problem.

8. The method of claim 1, wherein the group of similar alerts in the alert data store have been clustered by a machine learning model.

9. The method of claim 1, wherein identifying the one or more successful remediation actions of the matching previous alerts includes identifying any remediation action that occurred within a specified period of time of corresponding closures of alerts among the matching previous alerts.

10. The method of claim 9, further comprising storing the identified one or more remediation actions that occurred within the specified period of time of corresponding closures of alerts in a list of successful remediation actions.

11. The method of claim 1, wherein evaluating the one or more successful remediation actions includes determining a ranking score for each of the one or more successful remediation actions.

12. The method of claim 11, wherein the each ranking score is based at least in part on a number of times a corresponding one of the one or more successful remediation actions was successful for the matching previous alerts and a number of times the corresponding one remediation action was attempted for the matching previous alerts.

13. The method of claim 11, wherein the each ranking score is based at least in part on a cost associated with a failure of a corresponding one of the one or more successful remediation actions.

14. The method of claim 1, wherein initiating the performance of the selected one of the one or more successful remediation actions includes automatically applying the selected successful remediation action to the new alert.

15. The method of claim 1, wherein the selected one of the one or more successful remediation actions corresponds to a determination made by a user in response to the user being presented with a specified number of remediation action choices to apply to the new alert.

16. The method of claim 15, wherein the specified number of remediation action choices have been presented to the user via a mobile device.

17. A system, comprising:
one or more processors configured to:
receive a new alert associated with a computer information technology issue to be remediated;
determine matching previous alerts similar to the new alert including by being configured to identify a group of similar alerts in an alert data store that are at least substantially similar, according to a specified metric, to the new alert, wherein the specified metric is a vector distance between a feature vector associated with the new alert and candidate clusters of alerts stored in the alert data store;
identify one or more successful remediation actions of the matching previous alerts;
evaluate the one or more successful remediation actions; and
initiate a performance of a selected one of the one or more successful remediation actions; and
a memory coupled to at least one of the one or more processors and configured to provide at least one of the one or more processors with instructions.

18. The system of claim 17, wherein the computer information technology issue is associated with one or more of the following: an unresponsive software process, an unresponsive software application, a software runtime error, a software failure to execute, or a software failure to terminate.

19. The system of claim 17, wherein the computer information technology issue is associated with one or more of the following: a power supply failure, a hard drive failure, overheating, a connection cable failure, or a network connectivity failure.

20. A computer program product embodied in a non-transitory computer readable medium and comprising computer instructions for:
receiving a new alert associated with a computer information technology issue to be remediated;
determining matching previous alerts similar to the new alert, wherein determining the matching previous alerts includes identifying a group of similar alerts in an alert data store that are at least substantially similar, according to a specified metric, to the new alert, wherein the specified metric is a vector distance between a feature vector associated with the new alert and candidate clusters of alerts stored in the alert data store;
identifying one or more successful remediation actions of the matching previous alerts;
evaluating the one or more successful remediation actions; and
initiating a performance of a selected one of the one or more successful remediation actions.

* * * * *